(12) United States Patent
Cartridge et al.

(10) Patent No.: US 9,796,861 B2
(45) Date of Patent: Oct. 24, 2017

(54) INK JET INK COMPOSITIONS

(71) Applicant: Lubrizol Advanced Materials, Inc., Cleveland, OH (US)

(72) Inventors: David Cartridge, Bolton (GB); Elliot Coulbeck, Bury (GB); Chris Furmston, Handforth (GB); Dean Thetford, Norden (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 15/302,013

(22) PCT Filed: Apr. 2, 2015

(86) PCT No.: PCT/US2015/023963
§ 371 (c)(1),
(2) Date: Oct. 5, 2016

(87) PCT Pub. No.: WO2015/157071
PCT Pub. Date: Oct. 15, 2015

(65) Prior Publication Data
US 2017/0183518 A1    Jun. 29, 2017

Related U.S. Application Data

(60) Provisional application No. 61/976,640, filed on Apr. 8, 2014.

(51) Int. Cl.
| | |
|---|---|
| C09D 11/03 | (2014.01) |
| C09D 11/322 | (2014.01) |
| C09B 67/04 | (2006.01) |
| C09B 67/00 | (2006.01) |
| C09D 17/00 | (2006.01) |
| C04B 41/00 | (2006.01) |
| C04B 41/48 | (2006.01) |
| C04B 41/83 | (2006.01) |
| B41J 2/01 | (2006.01) |

(52) U.S. Cl.
CPC ............ *C09D 11/03* (2013.01); *B41J 2/01* (2013.01); *C04B 41/009* (2013.01); *C04B 41/0072* (2013.01); *C04B 41/4896* (2013.01); *C04B 41/83* (2013.01); *C09B 67/0002* (2013.01); *C09B 67/0022* (2013.01); *C09D 11/322* (2013.01); *C09D 17/007* (2013.01)

(58) Field of Classification Search
None
See application file for complete search history.

(56) References Cited

U.S. PATENT DOCUMENTS

| | | |
|---|---|---|
| 7,265,197 B2 | 9/2007 | Huber et al. |
| 8,133,914 B2 | 3/2012 | Thetford et al. |
| 8,167,992 B2 | 5/2012 | Thetford et al. |
| 2005/0120911 A1 | 6/2005 | Huber et al. |
| 2008/0033102 A1 | 2/2008 | Huber et al. |
| 2008/0196622 A1* | 8/2008 | Zhu ............... C09D 11/0235 106/31.26 |
| 2009/0142526 A1 | 6/2009 | Romanova et al. |
| 2010/0035958 A1 | 2/2010 | Thetford et al. |

FOREIGN PATENT DOCUMENTS

| | | |
|---|---|---|
| WO | 2008070601 A2 | 6/2008 |
| WO | 2012107379 A1 | 8/2012 |
| WO | 2012116878 A1 | 9/2012 |

* cited by examiner

*Primary Examiner* — Lisa M Solomon
(74) *Attorney, Agent, or Firm* — Samuel B. Laferty; Teresan W. Gilbert

(57) ABSTRACT

The invention provides dispersed inorganic mixed metal oxide pigment compositions utilizing a carboxylic acid, containing dispersant and a mixed metal oxide pigment. The metal oxide pigment is of the type used to color ceramic or glass articles. The dispersant, in addition to at least one carboxylic acid group, comprises at least one 300-3000 g/mole solubilizing chain of repeating units from hydrocarbylene or repeating units from C3 or C4 alkylene ethers or mixtures of said ethers. A milling process using beads is also described to reduce the mixed metal oxide particle size to the desired range. A method of using the mixed metal oxide dispersion to digitally print an image on a ceramic or glass article using the dispersion jetted through a nozzle and firing the colored article is also described.

20 Claims, No Drawings

INK JET INK COMPOSITIONS

CROSS REFERENCE TO RELATED APPLICATION

This application claims priority from PCT Application Serial No. PCT/US2015/023963 filed on Apr. 2, 2015, which claims the benefit of U.S. Provisional Application No.: 61/976,640 filed on Apr. 8, 2014.

FIELD OF INVENTION

The invention provides dispersants and dispersed pigment compositions useful for the colouration of ceramic articles and glass. The dispersed pigments are those of the type that develop their colouration during high temperature ceramic firing of a coating on the ceramic article or glass. The dispersed pigments are desirably suitable for jetting through a nozzle during a digitally controlled printing operation.

BACKGROUND OF THE INVENTION

Dispersants containing terminal acidic groups, such as, carboxylic acid (such as derivatives of 1,2,4-benzenetricarboxylic acid), phosphates and sulphates are known for dispersing conventional pigments (i.e., pigments utilized as dispersed particles in a binder and characterized for adsorbing certain wavelengths of visible light and reflecting other wavelengths). The phosphate and sulphates are generally prepared by reaction of a hydroxy terminated polymer chain with phosphorus pentoxide, phosphorus oxychloride, polyphosphoric acid or sulphuric acid. The dispersant polymer chains are often derived from polyester or polyalkoxylate chains containing terminal hydroxyl groups. These dispersants known in the art containing terminal acidic groups are suitable for a polar continuous medium, such as, water, ketones, esters and the like.

Civilizations have made a variety of ceramic articles such as cooking and serving vessels, water and other fluid containers, tiles, bricks, etc., for thousands of years. These were typically coloured or decorated with metal oxide type pigments that developed more intense colours during an elevated temperature firing of the pigment and ceramic article. The metal oxide type colouration pigments were thought to chemically interact and interpenetrate at high temperatures with the ceramic composition and/or with more glassy compositions sometimes applied with the colouration pigments or subsequently applied. The more glassy compositions were often to provide impermeable or barrier properties to the outer surface of the ceramic article (to protect the ceramic article from environmental materials with which it might come in contact).

With conventional organic pigments in polymeric organic binder, the particle size and particle uniformity are very important to get consistent and intense colouration. Inorganic metal oxide pigments for inorganic ceramic colouration are generally not as well understood as organic pigments. The particle size of the inorganic metal oxide pigments generally has not been studied and controlled to the extent that particle sizes of pigments has been controlled for use in polymeric organic coatings and inks. With interest in converting from older printing technologies to digitally printing on ceramic articles using ink jet nozzle technology, there is a need to reduce the particle sizes of inorganic metal oxide pigments to avoid plugging ink jet nozzles.

U.S. 2005/0120911 and U.S. 2008/0033102 disclose polymeric dispersants prepared from a Jeffamine monoamine and 1,2,4-benzenetricarboxylic acid anhydride, and a polyisobutylene amine and 1,2,4-benzenetricarboxylic acid anhydride, respectively. The former agents are used as dispersants on inorganic and organic lake pigments in polar solvents such as ester and alcohols and are not useful in non-polar solvents such as aliphatic mineral oil. The latter agents are used as dispersants in non-polar solvents only and cannot be used in polar solvents.

U.S. Pat. No. 8,167,992 discloses polyether amine based dispersants containing a polar inorganic group. The polar inorganic group includes groups such as a sulphur or phosphorus acidic polar head group.

US 2009/0142526 to Sun Chemical Corp. teaches a dispersant which is the reaction product of at least one dianhydride with at least two different reactants, each of which can be an amine, alcohol, or thiol, and at least one of which is polymeric. The polymeric component is often based on a poly(alkylene oxide) backbone.

U.S. Pat. No. 8,133,914 teaches dispersants comprising poly(alkylene oxide) and aromatic carboxylic acid.

WO2012/107379A1 is directed to a aminic dispersant with poly(oxyalkylenecarbonyl) solubilizing chain and WO2012/116878A1 is directed to ceramic ink for inkjet printers utilizing a dispersant from polyethyleneimine with homo or copolymers based on lactic acid.

SUMMARY OF THE INVENTION

It has been found that certain dispersants show excellent ability to disperse inorganic pigments (preferably mixed metal oxide pigments) to produce colloidally stable non-aqueous dispersions, non-aqueous ink jet ink dispersions and final non-aqueous ink jet inks for the colouration of ceramic tiles and glass using ink jet ink printers. Thus, according to the present invention, there is provided a composition comprising a particulate solid, a non-polar medium and a dispersing agent derived from the reaction of a hydroxyl or amine terminated polyhydrocarbylene or poly(alkylene oxide) reacted with a $C_2$-$C_{24}$ polycarboxylic acid wherein the carbon range includes the carbonyl carbons of the carboxylic acid and derivatives such as anhydrides and esters. The reaction product can be represented by the Formula (1)

$$[R-X]_m\text{-}Q \qquad (1)$$

wherein R is
  i) a $C_{20-200}$ hydrocarbylene chain linked to a terminal hydroxyl or amine group that reacts to form X, or
  ii) a monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$ alkylene oxide, or
  iii) a combination of i) and ii) when m is greater than 1; or
  iv) a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;
m is 1-3, preferably 1 or 2;
X is O, NG, N or mixtures thereof;
G is H or an optionally substituted $C_{1-36}$ hydrocarbylene group, or is the residue of a Michael addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X, and Q contains at least one residual, free acidic carboxyl group and can optionally contain heteroatoms, such as O and N, and halogens such as Cl and Br or mixtures thereof.

DETAILED DESCRIPTION OF THE INVENTION

The formula [R—X]$_m$-Q can be thought of as the reaction product of R' with Q' where R' is a polyhydrocarbylene functionalized with an amine or hydroxyl terminal group or a polyether functionalized with an amine or hydroxyl terminal group and Q' is a $C_2$-$C_{24}$ polycarboxylic acid (or derivative thereof such as ester, acid chloride, anhydride) having at least two carboxylic acid groups or an anhydride thereof and no more than six carbonyl groups, and wherein the carbon range includes the carbonyl carbons of the carboxylic acid and derivatives such as anhydrides and esters. Thus, the reaction is initially simply a nucleophilic attack of a nitrogen atom of an amine or the oxygen atom of the hydroxyl group of R' to the carbonyl carbon of Q' to form an amide or ester linkage respectively. In the case where a primary amide is formed, G is H and Q' contains additional carbonyl carbons, a 5- or 6-membered cyclic imide may be formed depending on reaction temperature conditions.

A variety of ways are possible to functionalize the polyhydrocarbylene or poly(alkylene oxide) with a terminal hydroxyl or amine group. The polyhydrocarbylene functionalized with a terminal hydroxyl group can be a hydrocarbyl-substituted phenol that can have 20 to 200 carbon atoms, in another instance 20 to 180 carbon atoms, and in a further instance 20 or 40 to 110 carbon atoms. This hydrocarbyl substituent (R) can be derived from an olefin or a polyolefin.

The olefin or polyolefins (R) which can form the hydrocarbyl substituent can be prepared by polymerizing olefin monomers by well-known polymerization methods and are also commercially available. The olefin monomers include mono-olefins, including mono-olefins having 2 to 10 carbon atoms such as ethylene, propylene, 1-butene, isobutylene, and 1-decene. An especially useful mono-olefin source is a $C_4$ refinery stream having a 35 to 75 weight percent butene content and a 30 to 60 weight percent isobutene content. Useful olefin monomers also include diolefins such as isoprene and 1,3-butadiene. Olefin monomers can also include mixtures of two or more mono-olefins, of two or more diolefins, or of one or more mono-olefins and one or more diolefins. Useful polyolefins include polyisobutylenes having a number average molecular weight of 300 to 3000, in another instance of 400 to 3000, and in a further instance of 400 or 500 to 2500. The polyisobutylene can have a vinylidene double bond content of 5 to 69 percent, in a second instance of 50 to 69 percent, and in a third instance of 50 to 95 percent. The polyolefin can be a homopolymer prepared from a single olefin monomer or a copolymer prepared from a mixture of two or more olefin monomers. Also possible as the hydrocarbyl substituent source are mixtures of two or more homopolymers, two or more copolymers, or one or more homopolymers and one or more copolymers. A hydrocarbyl-substituted phenol can be prepared by alkylating phenol with an olefin or polyolefin described above, such as a polyisobutylene or polypropylene, using well-known alkylation methods.

The polyhydrocarbylene functionalized with a terminal amino group can be a polyalkene-substituted amine. One method of preparation of a polyalkene-substituted amine involves reacting a halogenated olefin polymer with an amine, as disclosed in U.S. Pat. Nos. 3,275,554; 3,438,757; 3,454,555; 3,565,804; 3,755,433; and 3,822,289. Another method of preparation of a polyalkene-substituted amine involves reaction of a hydroformylated olefin with a polyamine and hydrogenating the reaction product, as disclosed in U.S. Pat. Nos. 5,567,845 and 5,496,383. Another method of preparation of a polyalkene-substituted amine involves converting a polyalkene by means of a conventional epoxidation reagent with or without a catalyst, into the corresponding epoxide and converting the epoxide into the polyalkene substituted amine by reaction with ammonia or an amine under the conditions of reductive amination, as disclosed in U.S. Pat. No. 5,350,429. Another method for preparing polyalkene-substituted amine involves hydrogenation of a β-aminonitrile, which is made by reacting an amine with a nitrile, as disclosed in U.S. Pat. No. 5,492,641. Yet another method for preparing polyalkene-substituted amine involves hydroformylating a polybutene or polyisobutylene with a catalyst, such as, rhodium or cobalt, in the presence of CO and $H_2$ at elevated pressures and temperatures, as disclosed in U.S. Pat. No. 4,832,702.

The above methods for the preparation of polyalkene substituted amine are for illustrative purposes only and are not meant to be an exhaustive list. The polyalkene-substituted amines of the present invention are not limited in scope to the methods of their preparation disclosed hereinabove. In one embodiment, the olefin polymers used to make the polyalkene-substituted amine of the present invention are derived from olefin polymers. The olefin polymers include homopolymers and interpolymers of polymerizable olefin monomers of 2 to about 16 carbon atoms, and in one embodiment from 2 to about 6 carbon atoms, and in one embodiment from 2 to about 4 carbon atoms. The interpolymers are those in which two or more olefin monomers are interpolymerized according to well-known conventional procedures to form polyalkenes having units within their structure derived from each of said two or more olefin monomers. Thus, "interpolymer(s)", as used herein, is inclusive of copolymers, terpolymers, and tetrapolymers. As will be apparent to those of ordinary skill in the art, the polyalkenes from which the polyalkene-substituted amines (a) are derived are often conventionally referred to as "polyolefin(s)". The olefin monomers from which the olefin polymers are derived include polymerizable olefin monomers characterized by the presence of one or more ethylenically unsaturated groups (i.e., >C=C<); that is they are mono-olefinic monomers such as ethylene, propylene, 1-butene, isobutene (2-methyl-1-butene), 1-octene or polyolefinic monomers (usually diolefinic monomers), such as, 1,3-butadiene and isoprene. The olefin monomers are usually polymerizable terminal olefins; that is, olefins characterized by the presence in their structure of the group >C=CH$_2$. However, polymerizable internal olefin monomers characterized by the presence within their structure of the group

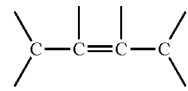

can also be used to form the polyalkenes.

Specific examples of terminal and internal olefin monomers which can be used to prepare the polyalkenes according to conventional, well-known polymerization techniques include ethylene; propylene; the butenes (butylenes), including 1-butene, 2-butene and isobutene; 1-pentene; 1-hexene; 1-heptene; 1-octene; 1-nonene; 1-decene; 2-pentene; propylene-tetramer; diisobutylene; isobutylene trimer; 1,2-butadiene; 1,3-butadiene; 1,2-pentadiene; 1,3-pentadiene; 1,4-pentadiene; isoprene; 1,5-hexadiene; 2-methyl-5-propyl-1-hexene; 3-pentene; 4-octene; and 3,3-dimethyl-1-pentene. In one embodiment the olefin polymer is obtained by polymerization of a $C_4$ refinery stream having a butene content of about 35 to about 75 weight percent and isobutene content of about 30 to about 60 weight percent, in the presence of a Lewis acid catalyst such as aluminum trichloride or boron trifluoride. These polybutenes typically contain predominantly (greater than about 80% of total repeating units) isobutene repeating units of the configuration:

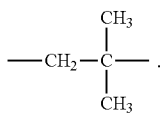

The amines that can be used include ammonia, monoamines, polyamines, or mixtures thereof, including mixtures of different monoamines, mixtures of different polyamines, and mixtures of monoamines and polyamines (which include diamines). The amines include aliphatic, aromatic, heterocyclic and carbocyclic amines. The monoamines and polyamines are characterized by the presence within their structure of at least one H—N< group. Therefore, they have at least one primary (e.g. $H_2N$—) or secondary amine (e.g. 1 H—N<) group. The amines can be aliphatic, cycloaliphatic, aromatic or heterocyclic.

The easiest way to put an amino group on a polyether is illustrated in the examples of this specification. Amino functionalized poly(alkylene oxides) are also commercially available from companies such as Huntsman under the names Surfonamines™ or Jeffamines™.

A preferred particulate solid is mixed metal oxides used in the colouration of ceramic tiles and glass. For the purposes of this invention, mixed metal oxides is interpreted as the solid containing at least two different metals in the same or different oxidation states. A particular improvement from using the dispersants of this disclosure includes the reduction of metal contaminants derived from abrasive wear of the milling equipment as the particular mixed metal oxides are hard to mill and require hard ceramic beads to mill these pigments. The dispersants of this disclosure tend to shorten the milling time required to meet a desirable particle size. When the total milling time on bead mills using hard ceramic beads is reduced, the amount of abrasive wear on both the beads and the internal components of the mill is generally reduced. Reducing the abrasive wear means less metal contaminants from the internal parts of the mill and the beads are introduced into the milled product. While metal contaminants are usually low in color in most pigment binder based coatings, metal contaminants can drastically affect color shade and color intensity in mixed metal oxides fired above 600° C. for colouring ceramic articles and glass.

This disclosure also provides for a method of milling a metal oxide pigment having an initial volume average particle diameter in excess of 1 micron in a non-polar solvent to a particle size of less 600 nanometres, said process comprising; a) blending a non-polar organic medium, a metal oxide pigment, optionally including a vitreous glaze material, having a 50% volume average particle diameter in excess of 1 micron, and a dispersing agent of the formula $[R-X]_m$-Q wherein R is a $C_{20-200}$ hydrocarbylene chain linked to a terminal hydroxyl or amine group that reacts to form X, or a monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$, or a combination of i) and ii) when m is greater than 1; or a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1; m is 1-3, preferably 1 or 2; X is O, NG, N or mixtures thereof; G is H or an optionally substituted $C_{1-36}$ hydrocarbylene group, or is the residue of a Michael addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X, and Q contains at least one residual, free acidic carboxyl group and can optionally contain heteroatoms, such as O and N, and halogens such as Cl and Br or mixtures thereof; milling said metal oxide pigment dispersed with said dispersing agent in said non-polar organic medium such as using a bead mill at a milling rate of 0.4 to 8 KWatt/hour per Kg of particulate or 5 mins to 60 hours milling time; confirming the average particle diameter of 50% volume of the particles is less than 600 nanometres. In one embodiment, the particulate material can have a dry powder volume average particle diameter D50 in excess of 1 micrometer at the start of the milling process.

This disclosure also provides a process for digitally printing on ceramic articles or glass articles using an ink jetted through a nozzle; by a) providing a mixed metal oxide pigment dispersed in a non-polar organic medium with a dispersing agent of the formula $[R-X]_m$-Q, wherein R is
i) a $C_{20-200}$ hydrocarbylene chain linked to a terminal hydroxyl or amine group that reacts to form X, or
ii) a monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$, or
iii) a combination of i) and ii) when m is greater than 1; or
iv) a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;
m is 1-3, preferably 1 or 2;
X is O, NG, N or mixtures thereof;
G is H or an optionally substituted $C_{1-36}$ hydrocarbylene group, or is the residue of a Michael addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X and Q contains at least one residual, free acidic carboxyl group and can be optionally substituted with a hydroxyl, a $C_{1-4}$ alkyl ether and a halogen or mixtures thereof; b) jetting said metal oxide dispersed in said non-polar organic medium using said dispersing agent according to a digital image to form an image that develops on said ceramic article during firing; c) optionally applying a glaze over said digital image; and d) firing said ceramic article at a temperature above 600° C. or tempering or annealing said glass article at a temperature above 400° C. to cause said mixed metal oxide to develop its color.

It has been found that certain dispersants show excellent ability to disperse inorganic pigments (particularly those mixed metal oxides) to produce colloidally stable non-aqueous dispersions, non-aqueous ink jet ink dispersions and final non-aqueous ink jet inks for the colouration of ceramic tiles or glass using ink jet ink printers. Thus, according to the present invention, there is provided a composition comprising a particulate solid, a non-polar medium and a dispersing agent derived from the reaction of a hydroxyl or amine terminated polyisobutylene or poly (alkylene oxide) reacted with a $C_2$-$C_{24}$ polycarboxylic acid. The reaction product can be represented by the formula (1)

$$[R\text{—}X]_m\text{-}Q \tag{1}$$

wherein R is
i) a $C_{20\text{-}200}$ hydrocarbylene chain linked to a terminal hydroxyl or amine group that reacts to form X, or
ii) a monosubstituted polyether chain obtained from poly ($C_{3\text{-}16}$-alkylene oxide) with a connecting group of 1 to 15 atoms to link to a terminal hydroxyl or amine group that reacts to form X where the alkylene oxide may be a mixture of $C_{3\text{-}16}$, or
iii) a combination of i) and ii) when m is greater than 1; or
iv) a $C_{1\text{-}19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;
m is 1-3, preferably 1 or 2;
X is O, NG, N or mixtures thereof;
G is H or an optionally substituted $C_{1\text{-}36}$ hydrocarbylene group, or is the residue of a Michael addition of an optionally substituted alkyl (meth)acrylate or (meth)acrylamide with X when it is an amine; and
Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X and Q contains at least one residual, free acidic carboxyl group and can optionally contain heteroatoms, such as O and N, and halogens such as Cl and Br or mixtures thereof.

In one embodiment, the reaction product represented by the Formula (1) $[R\text{—}X]_m$-Q can have one, two or three polymer chains R attached to Q and preferably has only one or two polymer chains R attached to Q. In the case where m is 2 or more and there are two or more polymer chains R attached to Q, these may be the same or different. In one embodiment, the formula $[R\text{—}X]_m$-Q may contain one R group which is based on a polyhydrocarbylene chain and another R group based on a monosubstituted polyether chain and these may have different molecular weights when m is 2 or more. In one embodiment, where there are different R groups attached to Q via the linkage X wherein X is O, NG or N, then X may be the same or different.

In one embodiment, the formula $[R\text{—}X]_m$-Q may contain at least one R group which is based on a $C_{20\text{-}200}$ hydrocarbylene chain or a monosubstituted polyether chain or mixtures thereof in combination with another R group based on a $C_{1\text{-}19}$ hydrocarbylene group when m is 2 or more.

Aminic $C_{1\text{-}19}$ hydrocarbylene groups, which can provide the R groups, can be derived from amines having the same range of carbon atoms. They include amines selected from linear and branched aliphatic primary amines selected from: methylamine, ethylamine, propylamine, butylamine, amylamine, hexylamine, heptylamine, octylamine, nonylamine, decylamine, undeylamine, dodecylamine, tridecylamine, 1-tetradecylamine, pentadecylamine, 1-hexadecylamine, octadecylamine, isopropylamine, sec-butylamine, isobutylamine, tert-butylamine, 1-methylbutylamine, 1,3-dimethylbutylamine, 3,3-dimethylbutylamine, 2-ethylhexylamine, 3-dimethylaminopropylamine, ethylenediamine, ethanolamine, N-methylethylenediamine and N,N'-dimethylethylenediamine, cyclic aliphatic primary amines selected from: cyclopentylamine, cyclohexylamine, cyclohexanemethylamine, and cycloheptylamine; unsaturated aliphatic primary amines selected from: allylamine and oleylamine; aromatic amines selected from aniline, 2-ethylaniline, 4-butylaniline, 4-cyclohexylaniline, 4-aminobiphenyl, 1-aminonaphthalene, 2-aminonaphthalene, benzylamine, phenethylamine, 3-phenyl-1-propylamine, 3-aminopropylimidazole, 4-phenylbutylamine, M-anisidine and P-phenetidine; secondary aliphatic amines selected from: dimethylamine, N-ethylmethylamine, diethylamine, dipropylamine, diisopropylamine, N-methylbutylamine, N-methyl-tert-butylamine, dibutylamine, dihexylamine, di-(2-ethylhexyl)amine, diisobutylamine, di-nonyl amine, dipentylamine, di-dodecyl amine, dioctylamine, dodecylamine and N-methyloctadecylamine; secondary aliphatic cyclic amines selected from: N-methylcyclohexylamine, N-ethylcylohexylamine, dicyclohexylamine, piperidine, morpholine and 4-methylpiperidine; secondary unsaturated aliphatic amines selected from: N-methylallylamine and diallylamine; and secondary aromatic amines selected from: N-methylaniline, N-ethylaniline, N-butylaniline, diphenylamine, N-ethyl-1-naphthylamine, N-benzylmethylamine, N-ethylbenzylamine, N-methylphenylamine, and 4-phenylpiperidine.

Hydroxyl functional $C_{1\text{-}19}$ hydrocarbylene groups, which can provide the R groups, can be derived from alcohols having the same range of carbon atoms. They include linear and branched aliphatic alcohols selected from: methanol, ethanol, propanol, butanol, pentanol, hexanol, heptanol, octanol, 2-ethylhexanol decanol, dodecanol, tetradecanol, hexadecanol, octadecanol, isopropanol, isobutanol, tert-butanol, 2-ethylbutanol, 2-ethylhexanol, 3-heptanol, 3,5,5-trimethylhexanol, 3,7-dimethyloctanol and the so-called Guerbet alcohols such as those which are commercially available under the trade name Isofol™ (ex Condea GmbH), or mixtures thereof (Guerbet alcohols include Isofol™ 12, 14T, 16); unsaturated aliphatic alcohols selected from: allyl alcohol, 4-penten-1-ol, 2-hexen-1-ol, 3-nonen-1-ol, and 7-dodecen-1-ol; cyclic aliphatic alcohols selected from: cyclopentanol, cyclopentanemethanol, cyclohexanol, cyclohexylmethanol, 4-cyclohexyl-1-butanol, 4-ethylcyclohexanol, and cycloheptanol; and aromatic alcohols selected from: phenol, ortho-cresol, 2-ethylphenol, 2-propylphenol, 2-allylphenol, 4-ethylphenol, nonylphenol, 2-naphthol, 4-phenylphenol, benzyl alcohol, sec-phenethyl alcohol, 4-ethylbenzyl alcohol, 4-butylbenzyl alcohol, 2-naphthalenemethanol, phenethyl alcohol, 3-phenyl-1-propanol, and 4-phenyl-1-butanol, cinnamyl alcohol and 4-propoxyphenol.

In one embodiment, the invention provides a compound of Formulae (1a) or salts thereof:

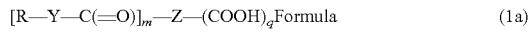

[R—Y—C(=O)]$_m$—Z—(COOH)$_q$ Formula      (1a)

wherein R is
i) a $C_{20-200}$ hydrocarbylene chain linked to a terminal hydroxyl or amine group that reacts to form X, or
ii) a monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$, or
iii) a combination of i) and ii) when m is greater than 1; or
iv) a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;
Y is O, NG, N—C(=O) wherein the carbon of the carbonyl group is attached to Z at a different carbon to each [R—Y—C(=O)]$_m$, or mixtures thereof;
G is hydrogen, or a $C_{1-36}$ optionally substituted hydrocarbylene, or is the residue of a Michael addition of an optionally substituted alkyl (meth)acrylate or (meth)acrylamide with the nitrogen atom;
Q has been replaced in Formula (1a) by the —(C(=O))$_m$—Z—(COOH)$_q$ group to better illustrate how multiple Y groups can be attached to Z;
Z is a direct bond, or a $C_1$ to $C_{20}$ aliphatic, aryl, alkaryl, aralkyl moiety, or mixtures thereof which may optionally contain halogen and/or heteroatoms such as O and N, and Z is attached to each [R—Y—C(=O)]$_m$ and each (COOH)$_q$ on the same or different carbon atoms of Z;
m is 1-3, and desirably 1 or 2, and more preferably 1; and
q is an integer from 1 to 5, and desirably 1 or 2.

In one embodiment, the structures represented by Formulas (2a), (2b) and (2c) show the various types of linkage between the R and Q of Formula (1) wherein Z is the Q group with the carbonyl groups separately shown.

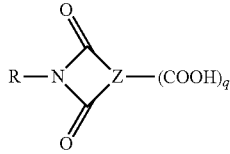

Formula (2a)

R—N(G)—C(=O)—Z—(COOH)$_q$      Formula (2b)

R—O—C(=O)—Z—(COOH)$_q$      Formula (2c)

Using polyhydrocarbylene linked to a mono or polycarboxylic acid species through an ester, amide or imide linkage as the dispersant chain has provided stable ink jet ink dispersions containing mixed metal oxides with low particle sizes in a much reduced milling time, better filterability of the dispersions leading to increased millbase yield, much brighter shades and dispersions with less metal impurities found in the mixed metal oxide dispersions.

Using poly(alkylene oxide) linked to a mono or polycarboxylic acid species through an ester, amide or imide linkage as the dispersant chain has provided stable ink jet ink dispersions containing mixed metal oxides with low particle sizes in a much reduced milling time, better filterability of the dispersions leading to increased millbase yield, much brighter shades and dispersions with less metal impurities found in the mixed metal oxide dispersions.

The R group, irrespective of whether it is polyhydrocarbylene or a poly(alkylene oxide), has a number average molecular weight from about 300 to about 3000 g/mole, and more desirably from about 500 to about 2500 or 2800 g/mole. In one embodiment, the polyhydrocarbylene of R is polyisobutylene. If R is polyisobutylene, the non-reactive end group can be isobutylene or other $C_1$-$C_{10}$ hydrocarbon. Such polyisobutylenes with a reactive carbon to carbon double bond at or near one terminus are commercially available from a number of suppliers. Polyisobutylenes converted to having one terminal amino group or hydroxyl group are also commercially available. If R is poly(alkylene oxide), it desirably has one reactive end group before coupling via X that was hydroxyl or amine. The other end group of a poly(alkylene oxide) useful in this disclosure is desirably a relatively non-reactive $C_1$ to $C_{36}$, or $C_1$ to $C_{20}$ hydrocarbyl group such as alkyl, aryl, aralkyl, alkaryl, cycloalkyl or alkyl, which may be linear or branched. Examples of the terminal group can include phenyl, napthyl, phenylethyl, benzyl, octyl phenyl, nonyl phenyl, cyclopropyl, cyclohexyl, linear or branched alkyls (including branched alkyls derived from initiating the poly(alkylene oxide) with Guerbet alcohols.

As previously set forth the alkylene of the poly(alkylene oxide) may have from 3 to 16 carbon atoms. The poly(alkylene oxide) may contain small amounts of ethylene oxide, e.g. less than 5, 3, 2, or 1 weight percent of the poly(alkylene oxide). The preferred alkylene units of the polyalkylene oxide are $C_3$ and $C_4$ linear and branched alkylene units such as —CH$_2$CH$_2$CH$_2$CH$_2$O— or —CH$_2$CH(CH$_3$)CH$_2$O— or —CH$_2$CH(CH$_3$)O— or CH$_2$—CH(CH$_2$—CH$_3$)—O—. Larger alkylene units like styrene oxide, 1,2-epoxydodecane and 1,2-epoxyhexadecane are possible repeat units, but tend to be more expensive and possibly are available only in limited quantities. Thus, the amount of $C_5$-$C_{16}$ alkylene oxide repeat units will be generally less than the amount of $C_3$-$C_4$ alkylene oxide repeat units in preferred compositions.

In one embodiment, the compound of Formula (1) comprises a R group containing —CH$_2$CH$_2$CH$_2$CH$_2$O—, —CH$_2$CH(CH$_3$)O— and/or —CH$_2$—CH(CH$_2$—CH$_3$)—O— repeat units. In one embodiment, the poly(alkylene oxide) will comprise 80, 90, 95 or 100% of $C_{3-4}$-alkyleneoxy repeat units.

In one embodiment, Z—(COOH)$_q$ may be the residue of 1,2,4-benzenetricarboxylic acid anhydride, 1,2,4,5-benzenetetracarboxylic dianhydride, citric acid, succinic anhydride, malonic acid, tartaric acid, malic acid, benzophenone-3,3',4,4'-tetracarboxylic dianhydride, ethylenediaminetetraacetic dianhydride, phthalic anhydride, homophthalic acid, glutaric anhydride, oxalic acid, 1,2,3,4-butanetetracarboxylic acid, tricarballylic acid, agaric acid, 1,3,5-cyclohexanetricarboxylic acid, 1,3,5-pentanetricarboxylic acid, 3-butene-1,2,3-tricarboxylic acid, ethylenediamine tetraproprionic acid, 1,1-cyclohexanediacetic acid, 1,2-cyclohexanedicarboxylic acid or anhydride, 1,3- and 1,4-cyclohexane dicarboxylic acids, hexahydro-4-methylphthalic anhydride, homophthalic anhydride, 4-methylphthalic anhydride, tetrachlorophthalic anhydride, tetrabromophthalic anhydride, 3-nitrophthalic anhydride, 1,8-naphthalic anhydride, Itaconic anhydride, 2-dodecen-1-ylsuccinic anhydride, cis-1,2,3,6-tetrahydrophthalic anhydride, maleic anhydride, 1,4,5,6,7,8-hexachloro-5-norbornene-2,3-dicarboxylic anhydride, 1,4,5,8-naphthalenetetracarboxylic dianhydride, perylene-3,4,9,10-tetracarboxylic dianhydride, bicyclo(2.2.2.)oct-7-ene-2,3,5,6-tetracarboxylic dianhydride, succinic acid, adipic acid, pimelic acid, suberic acid, sebacic acid, hexadecanedioic acid, mucic acid, diglycolic acid, phenylsuccinic acid, aconitic acid, trimellitic anhydride chloride, ethyl chlorooxoacetate, phthaloyl chloride, terephthaloyl chloride, or mixtures thereof. If an anhydride is listed the acid form is also desirable and vice versa.

In one embodiment, where X is N or NG, the group R—N— or R—NG- may be the residue of a polyalkyleneoxide monoalkyl ether or monoalkaryl ether monoamine. Monoamine compounds of this type are commercially available as the Surfonamine™ B-series of monoamines from Huntsman Corporation. Specific examples of Surfonamine™ amines are B100.

In one embodiment, where X is O, the group R—O— may be the residue of a polyalkyleneoxide monoalkyl ether or monoalkaryl ether alcohol. Monoalcohol compounds of this type are commercially available such as polypropyleneglycol monobutyl ether of various molecular weights from Aldrich or under the tradename Synalox™ from Dow or Polyglykol™ from Clariant. Specific examples of Synalox™ are 100-D20, 100-40B, 100-50B, 100-D95 and 100-150B. Specific examples of Polyglykol™ are B01/20, B01/40, B01/80, B01/120 and B01/240. Polypropyleneglycol monoisotridecylether ether is available under the Polyglykol™ tradename from Clariant, a specific example is T01/35.

In one embodiment, the compound of Formula [R—X]$_m$-Q is in the form of a salt. Examples of a suitable salting agent include ammonia, a mono-alkanolamine, such as ethanolamine, N-methyl ethanolamine; or a di-alkanolamine such as diethanolamine or N-methyl diethanolamine; or a tri-alkanolamine such as triethanolamine.

The polymeric dispersant may be prepared, for example, by reacting a polyether amine or polyisobutylene amine or polyether alcohol with 1,2,4-benzenetricarboxylic acid anhydride, 1,2,4,5-benzenetetracarboxylic dianhydride, citric acid monohydrate, and/or succinic anhydride. The dispersant of this disclosure may be prepared in a one-pot reaction. The polyether amine or polyether alcohol may be a copolymer of polypropylene oxide and butylene oxide depending on the particular type of media that the mixed metal oxide is going to be dispersed in. The reaction is typically carried out at a temperature of at least 70° C. The mixture of a poly(alkylene oxide) amine and 1,2,4-benzenetricarboxylic acid anhydride (and/or 1,2,4,5-benzenetetracarboxylic dianhydride) is stirred continuously and heated for a time ranging between 30 minutes and 24 hours, or for a period of about 6 hours.

When preparing an imide compound of the dispersant, the mixture is typically stirred at a temperature of 100° C. to 180° C., or at a temperature of 100° C. to 120° C. The temperature of the mixture can be raised up to 120° C., or up to 160° C., and maintained at this temperature for one hour up to 10 hours. The mixture is then allowed to slowly cool to room temperature.

For a dispersant containing an amide linkage, the mixture is typically stirred at a temperature typically in the range of 40° C. to 100° C., thus reducing the possibility of forming an imide structure. For a dispersant containing an ester linkage, the mixture is typically stirred at a temperature typically in the range of 120 to 180° C. for 6 to 24 hours optionally in the presence of an acidic catalyst such as ortho-phosphoric acid.

INDUSTRIAL APPLICATION

Coloration of ceramic tiles by ink jet ink technology is a rapidly growing application due to the variety and quality of images available for digital printing via ink jet inks. The mixed metal oxides used in older printing processes for ceramic articles and tiles were often too large to easily pass through the nozzles of most ink jet printers. Providing colloidally stable ink jet ink dispersions of mixed metal oxides with $D_{50}$ particle sizes below 600 nm in various non-polar media within a short milling time has been problematic.

In one embodiment, the compound of Formula [R—X]$_m$-Q is a dispersant for mixed metal oxide pigments of the type used to colour ceramic articles such as ceramic tiles or glass where the pigments are going to be exposed to firing at 600° C. and above to cause the pigments to go from a low intensity colour to an intense permanent color.

The particulate solid present in the composition may be any inorganic solid material (such as a pigment or glaze forming compound which is substantially insoluble in the organic medium) and which after firing at elevated temperatures provides a desirable color. In one embodiment, the particulate solid is a pigment. In another embodiment, the particulate solid is an aluminium or silica rich compound that helps form the glaze compound.

In one embodiment, the composition of the invention provides improved jetting efficiency, reduce nozzle plugging, reduced settling, and more consistent jetting in applications where a mixed metal oxide pigment is jetted onto a ceramic article, such as a ceramic tile, or on glass, in accordance with a digital image. In this application the use of the dispersants of this disclosure result in low concentrations of metal and metal oxide wear contaminants from the milling equipment and beads/balls. In one embodiment, the composition provided lower pigment particle size, better colloidal stability, lower amounts of entrained metal from the internal mill surfaces and beads.

Preferred pigments for colouration of ceramic objects or glass are Pigment Yellow 159 (Zr—Si—Pr, zircon praseodymium yellow or praseodymium yellow zircon) such as BASF Sicocer® F Yellow 2200; Pigment Red 232 (Zr—Si—Fe zircon) such as BASF Sicocer® F Coral 2300; Pigment Red 233 (Ca—Sn—Si—Cr, chrome tin pink sphene); Pigment Brown 33 (Zn—Fe—Cr, Spinel) such as BASF Sicocer® Brown 2700; Pigment Blue 72 (Co—Al—Cr, Cobalt Spinel blue); Pigment Blue 28 (Co—Al spinel) such as BASF Sicocer® Blue 2501; Pigment Blue 36 (Co—Al spinel) such as BASF Sicocer® Cyan2500; Pigment Black 27 (Co—Mn—Fe—Cr spinel) such as BASF Sicocer® Black 2900; and Pigment White 12 (Zr—Si) such as BASF Sicocer® White EDT/AK-4409/2.

The organic liquid of the invention may be a non-polar or a polar organic liquid, although a non-polar organic liquid is typically preferred. By the term "polar" in relation to the organic liquid, it is meant that an organic liquid is capable of forming moderate to strong bonds as described in the article entitled "A Three Dimensional Approach to Solubility" by Crowley et al. in Journal of Paint Technology, Vol. 38, 1966, at page 269. Polar organic liquids generally have a dielectric constant of 5 or more as defined in the above-mentioned article. Non-polar liquids typically have a dielectric constant of less than 5.

Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, non-polar organic liquids are compounds containing aliphatic groups, aromatic groups or mixtures thereof, preferably hydrocarbons of 6 to 40 carbon atoms, esters of various carboxylic acids of 4 to 30 carbon atoms with alcohols of 4 to 30 carbon atoms, and $C_2$ to $C_4$ alkylene oxides of 1 to 5 repeat units with hydroxyl, $C_1$-$C_5$ ether, or $C_2$-$C_5$ ester end groups. The non-polar organic liquids include non-halogenated aromatic hydrocarbons (e.g., toluene and xylene), halogenated aromatic hydrocarbons (e.g., chlorobenzene, dichlorobenzene, chlorotoluene), non-halogenated aliphatic hydrocarbons (e.g., linear and branched aliphatic hydrocarbons containing six or more carbon atoms both fully and partially saturated), halogenated aliphatic hydrocarbons (e.g., dichloromethane, carbon tetrachloride, chloroform, trichloroethane) and natural non-polar organics (e.g., vegetable oil, sunflower oil, linseed oil, terpenes and glycerides).

In one embodiment, the preferred solvents used in the dispersion of the ceramic mixed metal oxides with the dispersants of Formula (1) wherein R is a polyether chain include petroleum distillate (various boiling fractions including $C_{16-20}$ alkanes mixtures and cyclic alkanes), paraffin, mineral spirit, octyl octanoate, 2-ethylhexyl-stearate, 2-ethylhexyl-cocoate, di-octyl adipate, isopropyl laurate, ethylhexyl cocoate, tripropylene glycol bis-2-ethylhexanoate, tripropylene glycol mono-2-ethylhexanoate, propylene glycol dicaprylate, tripropylene glycol methyl ether, dipropylene glycol (methyl ether), di-propylene glycol (n-butyl ether), and isopropyl bisphenols such as 2,2-bis(4-hydroxy-3-isopropyl-phenyl)propane.

In one embodiment, the preferred solvents used in the dispersion of the ceramic mixed metal oxides with the dispersants of Formula (1) wherein R is a polyisobutylene chain include petroleum distillate (various boiling fractions), paraffin, mineral spirit, octyl octonoate, 2-ethylhexyl-stearate, 2-ethyl-hexyl-cocoate, di-octyl adipate, isopropyl laurate, ethylhexyl cocoate, tripropylene glycol bis-2-ethyl-hexanoate, tripropylene glycol mono-2-ethylhexanoate, propylene glycol dicaprylate, and isopropyl bisphenols.

The organic liquid, optionally, further contains less than 5, more desirably less than 2, and preferably less than 1 wt. % of water based on the weight of the dispersion in the media. In one embodiment, the organic liquid is free of water.

If desired, the compositions may contain other optional ingredients, for example, resins (where these do not already constitute the organic medium), binders, fluidizing agents, anti-sedimentation agents, plasticizers, surfactants, anti-foamers, rheology modifiers, levelling agents, gloss modifiers and preservatives.

The compositions typically contain from 1 to 85% by weight of the particulate solid, the precise quantity depending on the nature of the solid and the relative densities of the solid and the non-polar organic liquid. For example, a composition in which the solid is an inorganic material, such as an inorganic pigment, filler or extender, in one embodiment contains from 30 to 90% by weight of the solid based on the total weight of composition.

The composition may be prepared by any of the conventional methods known for preparing dispersions for coulouration of ceramic articles fired above 600° C. or for glasses annealed or tempered above 400° C. Thus, the solid, the organic medium and the dispersant may be mixed in any order, the mixture then being subjected to a mechanical treatment to reduce the particles of the solid to an appropriate size, for example, by ball milling, bead milling, gravel milling or plastic milling until the dispersion is formed. It is anticipated that a variety of particle size and dispersing equipment can be used sequentially to minimize total milling time and expense, such that a large particle size pigment can be dispersed in a continuous media with the dispersant, an initial pre-mix or pre-mill grinding to a desired particle size range, and then transfer to a bead type mill to further break down particulate particles into the $D_{50}$ 200-600 nanometre diameter (by volume average particle size measurements).

A process for milling a metal oxide pigment having a volume average particle diameter in excess of 1 micron in a non-polar solvent to a particle size of less 600 nanometres, said process comprising; a) blending a non-polar organic medium, a metal oxide pigment having a volume average particle diameter in excess of 1 micron, an a dispersing agent of the formula $[R-X]_m$-Q, wherein R is i) a $C_{20-200}$ hydrocarbylene chain linked to a terminal hydroxyl or amine group that reacts to form X, or ii) a 300 to 3000 g/mole molecular weight monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$ alkylene oxide, or iii) a combination of i) and ii) when m is greater than 1; or iv) a $C_{1-19}$ optionally substituted hydrocarbylene with heteroatoms, such as O and N, linked to a hydroxyl or amine that reacts with a carbonyl of Q to form X with a combination of i) or mixtures thereof, when m is greater than 1;

m is 1-3, preferably 1 or 2;

X is O, NG, N or mixtures thereof;

G is H or an optionally substituted $C_{1-36}$ hydrocarbylene group, or is the residue of a Michael addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X, and Q is represented by an ester, amide or imide group from coupling the compound of Q through ester, amide or imide forming reactions with X and Q contains at least one residual, free acidic carboxyl group and can optionally contain heteroatoms, such as O and N, and halogens such as Cl and Br or mixtures thereof; b) milling said metal oxide pigment dispersed with said dispersing agent in said non-polar organic medium such as using a bead mill at a milling rate of 0.4 to 8 KWatt/hour per Kg of particulate or for 5 minutes to 60 hours milling time, and c) confirming the volume average particle diameter $D_{50}$ is less than 600 nanometres.

In one embodiment, the beads used to mill the mixed metal oxide pigments are a ceramic bead rather than a metal bead. In further embodiments, using ceramic beads, it is desirable that the ceramic beads are zirconium dioxide, yttrium stabilized zirconia, and/or silicon carbide. The beads are often 0.3 to 0.4 mm in diameter. The mills are often horizontal bead mills and a popular supplier of the mills is Netzsch. The milling often targets a medium value of the particle size distribution where a volume average particle diameter of $D_{50}$ of 300 nm or less and a $D_{90}$ of 500 nm or less is achieved. A $D_{50}$ of 300 nm is a value in which 50% of the particles present in a particle size distribution have diameters greater than 300 nm and 50% have diameters below 300 nm. Milling times are from about 5 minutes to 60 hours, and more desirably from about 5 minutes to 48 hours. In one embodiment, the energy used by the mill over the time period disclosed above ranges from 0.4 to 8 KWatt/hour per Kg of particulate produced to give $D_{50}$ particles in the range disclosed above. The mills may use some classification methods to separate smaller particles from larger particles and then mill the different sized particles to different extents. Solvent may be added during milling to control viscosity, solids contents, etc. Dispersant may be added sequentially or continuously during milling as milling increases the surface area of a gram of pigment and it reduces its average particle size from in excess of 1 micron to less than 600, 500, or 300 nanometre.

While not wishing to be bound by theory, it is hypothesized that some dispersants are more effective at getting to newly created surfaces during milling and stabilizing the new surfaces of fractured particles against aggregation into larger particles. Some dispersants are better anchored to particulates and better colloidally stabilize the particles during high energy mixing against agglomeration into larger sized aggregates.

The composition of the present invention is particularly suited to liquid dispersions. In one embodiment, such dispersion compositions comprise:

(a) 0.5 to 60 parts of a particulate solid;
(b) 0.5 to 30 parts of a compound of $[R—X]_m$-Q; and
(c) 10 to 99 parts of an organic liquid; wherein all parts are by weight and the amounts (a)+(b)+(c)=100.

In one embodiment, the dispersants of formula $[R—X]_m$-Q can be used to make self dispersable or re-dispersable pigment concentrates for colouring ceramic articles. In this embodiment a continuous media that can be evaporated off or removed by centrifugation can be used to conduct the milling and then the pigment with dispersant thereon can be concentrated, stored, shipped etc., until needed in dispersion form. If a composition is required comprising a particulate solid and a dispersant of Formula $[R—X]_m$-Q in dry form, the organic liquid is typically volatile so that it may be readily removed from the particulate solid by a simple separation means such as evaporation. In one embodiment, the composition comprises the organic liquid.

The compositions of the invention are suitable for preparing mill-bases wherein the particulate solid is milled in an organic liquid in the presence of a compound of Formula $[R—X]_m$-Q or salts thereof. These millbases can be mixed in precise ratios to form colourants for ceramic articles having specific colour intensity and shade. It is anticipated that colourants for application by ink jet technology will comprise at least 3 and up to 12 different colours that can be ink jetted to form a variety of colours, shades, intensities, etc., on ceramic articles after firing at 600° C. or more.

Typically, the mill-base contains from 20 to 60% by weight particulate solid based on the total weight of the mill-base. In one embodiment, the particulate solid is not less than 10 or not less than 20% by weight of the mill-base. Such mill-bases may optionally contain a binder added either before or after milling.

The amount of dispersant in the mill-base is dependent on the amount of particulate solid but is typically from 0.5 to 12% by weight of the mill-base.

Dispersions and mill-bases made from the composition of the invention are particularly suitable as pigment dispersions for use in solvent-based inks for ceramic articles, especially where the inks are applied from non-aqueous media, and especially ink jet printed ceramic objects that are fired at 600° C. or above to develop the pigment color characteristic such as wall and floor tiles.

This disclosure also includes a process for digitally printing on ceramic article or glass article using an ink jetted through a nozzle;

a) providing a metal oxide pigment dispersed in a non-polar organic medium with a dispersing agent of the formula $[R—X]_m$-Q wherein R is
   i) a $C_{20-200}$ hydrocarbylene chain linked to a terminal hydroxyl or amine group that reacts to form X, or
   ii) a 300 to 3000 g/mole molecular weight monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$ alkylene oxide, or
   iii) a combination of i) and ii) when m is greater than 1; or
   iv) a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;

m is 1-3, preferably 1 or 2;

X is O, NG, N or mixtures thereof;

G is H or an optionally substituted $C_{1-36}$ hydrocarbylene group, or is the residue of a Michael addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X, and Q contains at least one residual, free acidic carboxyl group and can optionally contain heteroatoms, such as O and N, and halogens such as Cl and Br or mixtures thereof;

b) jetting said metal oxide dispersed in said non-polar organic medium using said dispersing agent according to a digital image to form an image that develops on said ceramic article or glass article during firing;

c) optionally applying a glaze over said digital image; and d) firing said ceramic article or glass article at an elevated temperature to cause said metal oxide to develop its color.

The coatings or inks made from mixed metal oxide dispersions and dispersants of this specification differ from conventional organic binder based coatings and inks in two additional details. The binder (if any) in the coatings and inks of this specification are substantially (e.g. >90 wt. %, >95 wt. %, or >99 wt. % based on the dried and heat treated coating or ink) inorganic material rather than organic material. A second significant difference is that the dispersants of this specification are significantly volatilized or burned away (e.g. >80 wt. %, >90 wt. %, or >99 wt. % of the dispersant is volatilized or burned away based on the weight of the dispersant prior to heat treatment). Thus, in organic binder systems the organic dispersant is retained in the final ink or coating as an interface between the binder and the particulate matter. In the inks and coatings of this specification the dispersant is only present until the heat treatment of the article and the coating or ink. After the heat treatment the dispersant is substantially burned away or volatilized so that the coating or ink and the particulate (e.g. pigment (mixed metal oxide) or vitreous material of the glaze) is substantially free of any organic dispersant at the interface between the particulate and the inorganic materials of the ceramic or glass.

Ceramic articles will generally mean a variety of useful and decorative items formed from clay and porcelain that develop additional strength from an elevated temperature treatment (such as about 400 to about 1200° C.) that fuses the inorganic material providing additional mechanical strength and resistance to liquids. They include, but are not limited to, tiles in various sizes and shapes, cups, jars, crocks, other storage vessels, bowls, plates, utensils, jewelry, bricks, etc. The ceramic articles can be intended for use inside a dwelling or for exterior use such as in building construction.

Glass articles include functional and decorative glass articles. Glass differs from ceramic in that ceramic is generally translucent at best where glass (unless intensely coloured) is generally transparent in thicknesses of about 0.5 mm such that size ten type can be read through glass panes under normal sunlight conditions. For the purpose of this specification, glass articles will generally have high concentrations of silica (e.g. $SiO_2$) of at least 50% by weight based on the entire glass portion of the article. Examples of glass compositions include lead-oxide glass at 59 wt. % silica, 2 wt. % $Na_2O$, 25 wt. % PbO, 12 wt. % $K_2O$, 0.4 wt. % alumina and 1.5 wt. % Zn; sodium borosilicate glass with about 81 wt. % silica, 12 wt. % $B_2O_3$, 4.5 wt. % $Na_2O$, and 2 wt. % $Al_2O_3$; soda-lime-silica window glass with about 72 wt. % silica, 14.2 wt. % $Na_2O$, 25 wt. % MgO, 10 wt. % CaO, and 0.6 wt. % $Al_2O_3$; and fused silica glass with 95+wt. % silica. Glass articles can generally include, but is not limited to, glass panes (including curved and non-flat panes), tubes, vials, bottles, beakers, flasks, glasses, cups, plates, bowls, pans, lenses, vessels, jars, spheres/balls, etc. In the past screen printing has been used to decorate some glass containers and articles with mixed metal oxide type pigments formed into an inorganic ink. These can somewhat permanently identify the contents with source, content, or trademark identification.

The following examples provide illustrations of the invention. These examples are non-exhaustive and are not intended to limit the scope of the invention.

EXAMPLES

Dispersant Example 1

A polyetheramine of MW1700 (134.8 parts), (derived from a $C_{12-15}$ alcohol reacted with butylene oxide followed by base catalyzed addition of the resultant polyether alcohol to acrylonitrile and subsequent hydrogenation to give an amine (80% active)), and 1,2,4-benzenetricarboxylic acid anhydride (10 parts) were heated to 120° C. under nitrogen with stirring and a Dean Stark fitted to the vessel to collect any water. After 2 hours, the temperature was increased to 160° C. After 1 hour at 160° C., the mixture was poured off into a glass jar. A dark amber liquid was obtained (140 parts) with an acid value of 23.9 mg KOH/g.

Dispersant Example 2

A polyetheramine of MW1650 (300 parts), (derived from a $C_{12-15}$ alcohol reacted with propylene oxide followed by base catalyzed addition of the resultant polyether alcohol to acrylonitrile and subsequent hydrogenation to give an amine (85% active)), and citric acid monohydrate (30 parts) were heated to 120° C. under nitrogen with stirring and a Dean Stark fitted to the vessel to collect any water. After 2 hours, the temperature was increased to 150° C. After 8 hours at 150° C., the mixture was poured off into a glass jar. An amber liquid was obtained (315 parts) with an acid value of 25.1 mg KOH/g.

Dispersant Example 3

A polyetheramine of MW1700 (220 parts), (derived from a $C_{12-15}$ alcohol reacted with butylene oxide followed by base catalysed addition of the resultant polyether alcohol to acrylonitrile and subsequent hydrogenation to give an amine (80% active)), and citric acid monohydrate (20 parts) were heated to 120° C. under nitrogen with stirring and a Dean Stark fitted to the vessel to collect any water. After 2 hours, the temperature was increased to 150° C. After 8 hours at 150° C., the mixture was poured off into a glass jar. An amber liquid was obtained (230 parts) with an acid value of 23 mg KOH/g.

Dispersant Example 4

A polyetheramine of MW1650 (100 parts), (derived from a $C_{12-15}$ alcohol reacted with propylene oxide followed by base catalysed addition of the resultant polyether alcohol to acrylonitrile and subsequent hydrogenation to give an amine (85% active)), and 1,2,4-benzenetricarboxylic acid anhydride (8.3 parts) were heated to 120° C. under nitrogen with stirring and a Dean Stark fitted to the vessel to collect any water. After 2 hours, the temperature was increased to 160° C. After 1 hour at 160° C., the mixture was poured off into a glass jar. A dark amber liquid was obtained (106 parts) with an acid value of 27.7 mg KOH/g.

Dispersant Example 5

Surfonamine B100 (ex Huntsman) (91.7 parts) and 1,2,4-benzenetricarboxylic acid anhydride (17.6 parts) were heated to 120° C. under nitrogen with stirring and a Dean Stark fitted to the vessel to collect any water. After 14 hours, the mixture was poured off into a glass jar. An amber liquid was obtained (103 parts) with an acid value of 49.6 mg KOH/g.

Dispersant Example 6

A polyetheramine of MW1700 (102.2 parts), (derived from a $C_{12-15}$ alcohol reacted with butylene oxide followed by base catalysed addition of the resultant polyether alcohol to acrylonitrile and subsequent hydrogenation to give an amine (80% active)), and succinic anhydride (4.4 parts) were heated to 70° C. under nitrogen with stirring. After 3 hours, the mixture was poured off into a glass jar. An orange viscous liquid was obtained (230 parts) with an acid value of 23.8 mg KOH/g.

Dispersant Example 7

A polyetheramine of MW1650 (105.4 parts), (derived from a $C_{12-15}$ alcohol reacted with propylene oxide followed by base catalysed addition of the resultant polyether alcohol to acrylonitrile and subsequent hydrogenation to give an amine (85% active)), and homophthalic acid (8.9 parts) were heated to 120° C. under nitrogen with stirring and a Dean Stark fitted to the vessel to collect any water. After 2 hours, the temperature was increased to 160° C. After 3.5 hours at 160° C., the mixture was poured off into a glass jar. A dark amber liquid was obtained (106 parts) with an acid value of 25 mg KOH/g.

Dispersant Example 8

A polyisobutylene amine of MW1060 (65% active in hydrocarbon oil) (537.35 parts), (derived from polyisobutylene and ethylene diamine), and 1,2,4-benzenetricarboxylic acid anhydride (63.3 parts) were heated to 120° C. under nitrogen with stirring and a Dean Stark fitted to the vessel to collect any solvent and water. After 1 hour, the temperature was increased to 160° C. After a further 3 hours at 160° C., the mixture was allowed to cool to 100° C. with stirring, and then Exxsol D140 (181.6 parts) was added. The mixture was stirred for 1 hour and then poured off into a glass jar. A black liquid was obtained (757 parts) (55% active).

Dispersant Example 9

A polyisobutylene amine of MW1060 (65% active in hydrocarbon oil) (89.6 parts), (derived from polyisobutylene and ethylene diamine), and citric acid monohydrate (11.5 parts) were heated to 120° C. under nitrogen with stirring and a Dean Stark fitted to the vessel to collect any solvent and water. Exxsol D140 (20 parts) was then added. After 1 hour, the temperature was increased to 160° C. After a further 7.5 hours at 160° C., the mixture was allowed to cool to 100° C. with stirring and then poured off into a glass jar. A black liquid was obtained (85 parts) (77% active).

Dispersant Example 10

A polyetheralcohol of MW1600 (963.6 parts), (derived from a $C_{12-15}$ alcohol reacted with propylene oxide), citric acid monohydrate (126.1 parts), and ortho-phosphoric acid (3.25 parts) were heated to 170° C. under nitrogen with stirring and a Dean Stark fitted to the vessel to collect any water. After 10 hours an orange liquid was obtained with an acid value of 63.2 mg KOH/g.

Dispersant Example 11

A polyetheralcohol of MW1600 (61.9 parts), (derived from a $C_{12-15}$ alcohol reacted with propylene oxide), 1,2,4-benzenetricarboxylic acid anhydride (7.57 parts), and ortho-phosphoric acid (0.7 parts) were heated to 120° C. under nitrogen with stirring and a condenser fitted. After 24 hours added polyetheramine of MW1650 (7.96 parts), (derived from a C12-15 alcohol reacted with propylene oxide followed by base catalysed addition of the resultant polyether alcohol to acrylonitrile and subsequent hydrogenation to give an amine (85% active)). After 3 hours removed the condenser. After 16 and half hours a brown clear liquid was obtained with an acid value of 62.85 mg KOH/g.

Dispersant Example 12

A polyetheralcohol of MW1600 (481.8 parts), (derived from a $C_{12-15}$ alcohol reacted with propylene oxide), citric acid monohydrate (62.99 parts), and ortho-phosphoric acid (1.63 parts) were heated to 170° C. under nitrogen with stirring and a Dean Stark fitted to the vessel to collect any water. After 18 hours an orange liquid was obtained with an acid value of 32.96 mg KOH/g.

Comparative Example A

Comparative Example A is Example 1 of U.S. Pat. No. 7,265,197 using Jeffamine™ M2005 (200 parts) and 1,2,4-benzenetricarboxylic acid anhydride (17.75 parts) to give an amber liquid (211 parts) with an acid value of 30.2 mg. KOH/g.

Comparative Milling Tests

Pigment Red 233 Dispersions

Dispersions are prepared by dissolving dispersants (28.69 parts as 100% active) in Exsol D140 (ex. ExxonMobil) (205.06 parts). Sicocer F Pink 10307 pigment (ex BASF) (191.25 parts) was added to each mixture and each were premixed using a saw tooth impeller at 2000 rpm for 60 mins.

Pigment Brown 33 Dispersions

Dispersions are prepared by dissolving dispersants (24 parts as 100% active) in Exsol D140 (ex. ExxonMobil) (216 parts). Sicocer F Brown 2726 pigment (ex. BASF) (160 parts) was added to each mixture and each were premixed using a saw tooth impeller at 2000 rpm for 60 mins.

Pigment Yellow 159 Dispersions

Dispersions are prepared by dissolving dispersants (27 parts as 100% active) in Exsol D140 (ex. ExxonMobil) (193 parts). Sicocer F Yellow 2214 pigment (ex. BASF) (180 parts) was added to each mixture and each were premixed using a saw tooth impeller at 2000 rpm for 60 mins.

Pigment Yellow 159 Dispersions in Ethylhexyl Cocoate and Isopropyl Laurate

Dispersions are prepared by dissolving dispersants (36.05 parts as 100% active) in ethylhexyl cocoate (ex. Croda) (160.28 parts) and Isopropyl Laurate (ex. Sigma Aldrich) (53.43 parts). Sicocer F Yellow 2214 pigment (ex. BASF) (200.25 parts) was added to each mixture and each were premixed using a saw tooth impeller at 2000 rpm for 30 mins.

Pigment Yellow 159 Dispersions in Iso Propyl Mistrate and Di-Octyl Adipate

Dispersions are prepared by dissolving dispersants (21.60 parts as 100% active) in Iso Propyl Mistrate (ex. Sigma Aldrich) (198.72 parts) and di-octyl abdicate (ex. Sigma Aldrich) (49.68 parts). Sicocer F Yellow 2214 pigment (ex. BASF) (180 parts) was added to each mixture and each were premixed using a saw tooth impeller at 2000 rpm for 30 mins.

Each premix was then milled using a Netzsch LAbStar/Mini Mill and a "mini" grinding chamber (0.161) under the following conditions; a 75% bead charge of 0.3-0.4 mm YTZ® beads at 4000 rpm, a pump speed of 15 rpm and a mill temperature of 30-40° C.; until a particle size of $D_{50}$ less than 500 nm and a $D_{90}$ of less than 900 nm was achieved. YTZ® is a trademark of Nikkato Corporation and the grinding media is a joint development of Nikkato Corp. and Tosoh Corp. of Tokyo, Japan. Particles sizes were obtained by taking a sample of the milling dispersion (0.04 parts) and diluting in toluene (8 parts) and measuring the particle size on a Nanotrac DLS particle size analyzer.

TABLE 1

Pigment Red 233 Dispersions

| Agent | Milling Time mins | Viscosity cps @30 $s^{-1}$ | Viscosity cps @30 $s^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 1 | 40 | 20 | 19 | 283/453 | 341/505 |
| Dispersant Example 2 | 60 | 17 | 14 | 303/468 | 411/713 |

TABLE 1-continued

Pigment Red 233 Dispersions

| Agent | Milling Time mins | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 4 | 90 | 14.5 | 18 | 294/473 | 291/460 |
| Dispersant Example 5 | 30 | 10 | 18 | 299/388 | 302/490 |
| Dispersant Example 6 | 60 | 21 | 18 | 369/742 | 328/691 |
| Dispersant Example 7 | 50 | 17 | 14 | 306/453 | 336/543 |
| Dispersant Example 8 | 60 | 25 | 22 | 335/518 | 335/509 |
| Dispersant Example 9 | 60 | 33 | 23 | 434/818 | 386/710 |
| Dispersant Example 10 | 45 | 16 | 11.5 | 271/399 | 264/382 |
| Dispersant Example 12 | 45 | 16.5 | 15 | 273/436 | 243/416 |
| Comparative Example A | Did Not Mill | N/A | N/A | N/A | N/A |
| Control (No Dispersant) | NA | N/A | N/A | nm | nm |

Control failed and gelled in the milling.

TABLE 2

Pigment Brown 33 Dispersions

| Agent | Milling Time mins | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 1 | 60 | 9 | 12.5 | 241/461 | 275/416 |
| Dispersant Example 3 | 60 | 10.5 | 14 | 244/535 | 278/424 |
| Dispersant Example 6 | 60 | 9 | 15.5 | 253/400 | 250/401 |
| Dispersant Example 8 | 120 | 23 | 21 | 264/638 | 290/401 |
| Control (No Dispersant) | N/A | N/A | N/A | 693 | 3850 |

Control failed and gelled in the milling.

TABLE 3

Pigment Yellow 159 Dispersions

| Agent | Milling Time mins | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 1 | 60 | 17 | 17 | 268/430 | 241/367 |
| Dispersant Example 3 | 30 | 13 | 14 | 412/527 | 236/569 |
| Dispersant Example 6 | 30 | 16 | 16 | 281/381 | 285/404 |
| Dispersant Example 8 | 120 | 33 | 29 | 283/560 | 259/391 |
| Control (No Dispersant) | NA | N/A | N/A | nm | nm |

Control failed and gelled in the milling.

TABLE 4

Pigment Yellow 159 Dispersions in in Ethylhexyl Cocoate and Isopropyl Laurate

| Agent | Milling Time mins | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 11 | 90 | 25 | 22.5 | 273/586 | 245/482 |
| Control (No Dispersant) | NA | N/A | N/A | nm | nm |

Control failed and gelled in the milling.

TABLE 5

Pigment Yellow 159 Dispersions in iso Propyl Mistrate and Di-Octyl Adipate

| Agent | Milling Time mins | Viscosity cps @30 s$^{-1}$ | Viscosity cps @30 s$^{-1}$ (after 3 weeks at 40° C.) | Particle Size nm $D_{50}/D_{90}$ | Particle Size nm $D_{50}/D_{90}$ (after 3 weeks at 40° C.) |
|---|---|---|---|---|---|
| Dispersant Example 1 | 45 | 16 | 15 | 241/310 | 235/482 |
| Dispersant Example 4 | 45 | 18 | 17 | 253/354 | 256/382 |
| Control (No Dispersant) | NA | N/A | N/A | nm | nm |

Control failed and gelled in the milling.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications, thereof, will become apparent to those skilled in the art upon reading the specification. Therefore, it is to be understood that the invention disclosed herein is intended to cover such modifications as fall within the scope of the appended claims.

What is claimed is:

1. A composition comprising a particulate solid, a non-polar medium and a dispersing agent of the formula (1)

$$[R-X]_m\text{-}Q \quad (1)$$

wherein R is
i) a $C_{20-200}$ hydrocarbylene chain linked to a terminal hydroxyl or amine group that reacts to form X, or ii) a 300 to 3000 g/mole monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$ alkylene oxide and wherein said polyether chain optionally includes up to 5 wt. %, based on the weight of the poly(alkylene oxide), of repeat units from ethylene oxide, or iii) a combination of i) and ii) when m is greater than 1; or iv) a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;

m is 1-3;

X is O, NG, N or mixtures thereof;

addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X, and Q contains at least one residual, free acidic carboxyl group and can optionally contain heteroatoms, such as O and N, and halogens such as Cl and Br or mixtures thereof, and wherein the particulate solid is a mixed metal oxide pigment that develops its color intensity and hue after firing at elevated temperatures.

2. The composition according to claim 1, wherein R is a polyisobutylene compound of 500 to 2800 g/mole molecular weight.

3. The composition according to claim 1, wherein R is a poly(alkylene oxide) compound of 500 to 2800 g/mole molecular weight and wherein the monosubstituted group on said polyether chain is a $C_1$-$C_{36}$ hydrocarbyl.

4. The composition according to claim 1, wherein X is an amide linkage.

5. The composition according to claim 1, wherein X is an imide linkage.

6. The composition according to claim 1, wherein X is an ester linkage.

7. The composition according to claim 1, wherein Q is derived from a polycarboxylic acid or an anhydride, thereof, having from 8 to 24 carbon atoms and optionally substituted with one or more halogen, oxygen, and/or nitrogen and having at least one aryl group and having from 2 to 6 carbonyl groups in the carboxylic acid, anhydrides thereof, or mixtures thereof.

8. The composition, according to claim 1, wherein Q is derived from an aliphatic polycarboxylic acid and/or an anhydride thereof having from 2 to 24 carbon atoms and optionally substituted with one or more halogen, oxygen, and/or nitrogen.

9. The composition as claimed in claim 1, wherein the particulate solid is at least one ceramic pigment of mixed metal oxides which contain a combination of two or more elements in cationic form selected from Al, Mg, Ca, Cd, Co, Cr, Fe, In, Mn, Ni, Pr, Sb, Se, Si, Sn, Ti, V, Zn and Zr.

10. The composition as claimed in claim 1, wherein the inorganic particulate is present from about 20 to about 60 wt. % of said composition.

11. A process for milling an inorganic particulate, having a dry powder volume average particle diameter $D_{50}$ in excess of 1 micron, in a non-polar solvent to a $D_{50}$ particle size of less than 600 nanometres, said process comprising;

a) blending a non-polar organic medium, said inorganic particulate material comprising a mixed metal oxide pigment, optionally including a vitreous glaze material, having a dry powder volume average particle diameter in excess of 1 micron, and a dispersing agent of the formula

$$[R-X]_m\text{-}Q \qquad (1)$$

wherein R is i) a $C_{20-200}$ hydrocarbylene chain linked to a terminal hydroxyl or amine group that reacts to form X, or ii) a 300 to 3000 g/mole monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$ alkylene oxide and wherein said polyether chain optionally includes up to 5 wt. %, based on the weight of the poly(alkylene oxide), of repeat units from ethylene oxide, or iii) a combination of i) and ii) when m is greater than 1; or iv) a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;

m is 1-3;

X is O, NG, N or mixtures thereof;

G is H or an optionally substituted $C_{1-36}$ hydrocarbylene group, or is the residue of a Michael addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X, and Q contains at least one residual, free acidic carboxyl group and can optionally contain heteroatoms, such as O and N, and halogens such as Cl and Br or mixtures thereof;

b) milling said mixed metal oxide pigment dispersed with said dispersing agent in said non-polar organic medium using a bead mill for 5 minutes to 60 hours; and c) confirming the volume average particle diameter $D_{50}$ is less than 600 nanometres.

12. A process for milling an inorganic particulate, having a dry powder volume average particle diameter $D_{50}$ in excess of 1 micron, in a non-polar solvent to a $D_{50}$ particle size of less than 600 nanometres, said process comprising;

a) blending a non-polar organic medium, said inorganic particulate material comprising a mixed metal oxide pigment, optionally including a vitreous glaze material, having a dry powder volume average particle diameter in excess of 1 micron, and a dispersing agent of the formula

$$[R-X]_m\text{-}Q \qquad (1)$$

wherein R is i) a $C_{20-200}$ hydrocarbylene chain linked to a terminal hydroxyl or amine group that reacts to form X, or ii) a 300 to 3000 g/mole monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$ alkylene oxide and wherein said polyether chain optionally includes up to 5 wt. %, based on the weight of the poly(alkylene oxide), of repeat units from ethylene oxide, or iii) a combination of i) and ii) when m is greater than 1; or iv) a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;

m is 1-3;

X is O, NG, N or mixtures thereof;

G is H or an optionally substituted $C_{1-36}$ hydrocarbylene group, or is the residue of a Michael addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X, and Q contains at least one residual, free acidic carboxyl group and can optionally contain heteroatoms, such as O and N, and halogens such as Cl and Br or mixtures thereof;

b) milling said mixed metal oxide pigment dispersed with said dispersing agent in said non-polar organic medium using a bead mill at a milling rate of 0.4 to 8 KWatt/hour per Kg of particulate; and c) confirming the volume average particle diameter $D_{50}$ so is less than 600 nanometres.

13. The process according to claim 11, wherein said metal oxide pigment contains a combination of two or more different elements in the form of cations selected from the group of Al, Mg, Ca, Cd, Co, Cr, Fe, In, Mn, Ni, Pr, Sb, Se, Si, Sn, Ti, V, Zn and Zr and wherein if R is a monosubstituted polyether chain, the monosubstituted group on said polyether chain is a $C_1$-$C_{36}$ hydrocarbyl.

14. A process for digitally printing on ceramic article or glass article substrate using an ink jetted through a nozzle, a) providing a mixed metal oxide dispersed in a non-polar organic medium with a dispersing agent of the formula

$$[R\text{---}X]_m\text{-}Q \qquad (1)$$

wherein R is i) a $C_{20-200}$ hydrocarbylene chain linked to a terminal hydroxyl or amine group that reacts to form X, or ii) a 300 to 3000 g/mole monosubstituted polyether chain obtained from poly($C_{3-16}$-alkylene oxide) with a connecting group of 1 to 15 atoms to link to a terminal hydroxyl or amine group that reacts to form X where the alkylene oxide may be a mixture of $C_{3-16}$ alkylene oxide and wherein said polyether chain optionally includes up to 5 wt. %, based on the weight of the poly(alkylene oxide), of repeat units from ethylene oxide, or iii) a combination of i) and ii) when m is greater than 1; or iv) a $C_{1-19}$ optionally substituted hydrocarbylene with heteroatoms, such as O and N, linked to a hydroxyl or amine that reacts with a carbonyl of Q to form X with a combination of i) or ii) or mixtures thereof, when m is greater than 1;

m is 1-3;

X is O, NG, N or mixtures thereof;

G is H or an optionally substituted $C_{1-36}$ hydrocarbylene group, or is the residue of a Michael addition of an optionally substituted alkyl (meth)acrylate or (meth)acrylamide with X when it is an amine; and Q is derived from a compound of 2 to 24 carbon atoms containing at least 2 or more carboxylic acids or derivatives thereof, such as 1 or more anhydride groups, where the linkage between X and Q is represented by an ester, amide or imide group from coupling the compound of Q through ester, amide or imide forming reactions with X, and Q contains at least one residual, free acidic carboxyl group and can optionally contain heteroatoms, such as O and N, and halogens such as Cl and Br or mixtures thereof;

b) jetting said mixed metal oxide dispersed in said non-polar organic medium using said dispersing agent onto said substrate, optionally where said substrate has had one or more layers of glaze applied thereon, to form a pigmented digital image on said substrate wherein said image develops into a colored image upon firing said ceramic substrate or heating said glass substrate to provide tempering or annealing;

c) optionally applying a glaze over said digital image; and d) heating said ceramic article at an elevated temperature or heating said glass article to anneal or temper it, wherein said image from metal oxide develops optimal color intensity upon heating to its color.

15. The process of claim 14, wherein the mixed metal oxide pigment that develops its color intensity and hue after firing at 600° C. or above for a ceramic substrate or 400° C. or above for a glass substrate and wherein if R is a monosubstituted polyether chain the monosubstituted group on said polyether chain is a $C_1$-$C_{36}$ hydrocarbyl.

16. The process of claim 14, wherein said metal oxide is at least one ceramic pigment of mixed metal oxides which contain a combination of two or more elements in cationic form selected from the group of Al, Mg, Ca, Cd, Co, Cr, Fe, In, Mn, Ni, Pr, Sb, Se, Si, Sn, Ti, V, Zn and Zr.

17. The process of claim 14, wherein said metal oxide is present in said dispersion of metal oxide in non-polar organic medium at a concentration of from about 20 to about 60 wt. %.

18. The process of claim 14, wherein R is a mono substituted polyether chain and said nonpolar organic medium is selected from petroleum distillate, octyl octonoate, 2-ethylhexyl-stearate, 2-ethylhexyl-cocoate, di-octyl adipate, isopropyl laurate, ethylhexyl cocoate, propylene glycol dicaprylate, tripropylene glycol bis-2-ethylhexanoate, tripropylene glycol mono-2-ethylhexanoate, tripropylene glycol (methyl ether), dipropylene glycol (methyl ether), di- propylene glycol (n-butyl ether), and isopropyl bisphenols such as 2,2-bis(4-hydroxy-3-isopropyl-phenyl)propane and mixtures thereof.

19. The process of claim 14, wherein R is a polyisobutylene and said nonpolar organic medium is selected from petroleum distillate, octyl octonoate, 2-ethylhexyl-stearate, 2-ethyl-hexyl-cocoate, di-octyl adipate, isopropyl laurate, ethylhexyl cocoate, propylene glycol dicaprylate, tripropylene glycol bis-2-ethylhexanoate, tripropylene glycol mono-2-ethylhexanoate, and isopropyl bisphenols such as 2,2-bis (4-hydroxy-3-isopropyl-phenyl)propane, and mixtures thereof.

20. The process according to claim 12, wherein said metal oxide pigment contains a combination of two or more different elements in the form of cations selected from the group of Al, Mg, Ca, Cd, Co, Cr, Fe, In, Mn, Ni, Pr, Sb, Se, Si, Sn, Ti, V, Zn and Zr and wherein if R is a monosubstituted polyether chain the monosubstituted group on said polyether chain is a $C_1$-$C_{36}$ hydrocarbyl.

* * * * *